United States Patent [19]

Lehle et al.

[11] 4,408,414
[45] Oct. 11, 1983

[54] DETECTION APPARATUS AND METHOD OF USE

[75] Inventors: Fredric R. Lehle, Lansing; James W. Maine, Mason; David Grossman; Richard A. Leavitt, both of Lansing; Alan R. Putnam, Haslett, all of Mich.

[73] Assignee: Board of Trustees operating Michigan State University, East Lansing, Mich.

[21] Appl. No.: 369,633

[22] Filed: Apr. 19, 1982

[51] Int. Cl.³ .............................................. A01G 1/00
[52] U.S. Cl. ......................................... 47/1 R; 47/14; 47/58
[58] Field of Search ........................... 47/1, 58, 14–16, 47/65, 1.4

[56] References Cited

U.S. PATENT DOCUMENTS

| | | | |
|---|---|---|---|
| 2,975,553 | 3/1961 | Paul | 47/1 R |
| 3,172,235 | 3/1965 | Bjorklund | 47/1.4 X |
| 3,209,492 | 10/1965 | Brandt | 47/16 |
| 3,504,185 | 3/1970 | Zweig et al. | 47/1.4 X |
| 3,852,914 | 12/1974 | Levengood | 47/58 |
| 4,230,983 | 10/1980 | Steere | 324/71 R |

OTHER PUBLICATIONS

Christ, R. A., J. of Exp. Botany, vol. 29, No. 110, pp. 603–610 (Jun. 1978).
Newman, E. I., J. Appl. Ecol., 3:139–145 (1966).
Rowse, H. R. et al., J. Appl. Ecol., 11:309–314 (1974).
Richards, D. et al., Plant and Soil, 52:69–76 (1979).
Goubran, F. H. et al., Plant and Soil, 52:77–83 (1979).
Voorhees, W. B., et al., Agronomy Journal, 72:847–851 (1980).

Primary Examiner—Robert E. Bagwill
Attorney, Agent, or Firm—Ian C. McLeod

[57] ABSTRACT

An apparatus for the detection and recording of the presence of a filament or other small object at a station (13) is described. The apparatus includes light beam detection means (70, 71) and means (14) for rotating the object at the station so that the object interrupts the light beam as it is rotated and is detected and recorded by a counting means (102, 108, 110). The apparatus is particularly useful for the detection of filaments and other small objects which cannot be positioned precisely at the station. The apparatus is specifically useful for detecting roots or shoots (201) resulting from seed (200) germination in a tube (11).

17 Claims, 5 Drawing Figures

DETECTION APPARATUS AND METHOD OF USE

BACKGROUND OF THE INVENTION

1. Field of the Invention

The present invention generally relates to a detection apparatus and particularly an apparatus adapted for the detection of seed germination. The present invention particularly utilizes a light beam at a work station for the detection.

2. Prior Art

U.S. Pat. Nos. 3,852,914 to Levengood and 4,230,983 to Steere describe seed viability detectors. These patents describe apparatus which use electrical conductivity of wet seeds or solutions with seeds to determine viability. These detectors require time consuming and careful set up and are affected by contamination. The results only correlate with the actual germination percentage of a given seed lot which in conventional practice is determined by direct observation and manual counting of imbibed seeds under controlled growing conditions. Christ, R. A., J. of Exp. Botany, Vol 29, No. 110, pages 603–610 (June 1978) describes a method whereby the elongation rate of leaves is measured directly by a counterweight used for the measurement which would not be useful for seed germination.

Various prior art references describe the measurement of root length using an estimating method based upon the intersection of a series of parallel lines overlapping the roots. One instrument uses a photoelectric detection device which scans a surface on which a root sample is placed using a parallel line pattern. Root interference reduces light intensity to the detection device thus indicating the presence of a root and can be used to calculate root length. References which describe this method are:

Newman, E. I., J. Appl. Ecol. 3:139–145 (1966)
Rowse, H. R. et al., J. Appl. Ecol. 11:309–314 (1974)
Richards, D. et al., Plant and Soil 52:69–76 (1979)
Goubran, F. H. et al., Plant and Soil 52:77–83 (1979)
Voorhees, W. B. et al., Agronomy Journal 72:847–851 (1980)

The method not be useful for the detection of seed germination because of interference of the seeds with the light.

OBJECTS

It is therefore an object of the present invention to provide an apparatus and method for the reliable detection of seed or plant growth on large numbers of samples over time. It is further an object of the present invention to provide a method which is not dependent upon the conductivity of a solution or other direct interaction with the seed. These and other objects will become increasingly apparent by reference to the following description and the drawings.

IN THE DRAWINGS

GENERAL DESCRIPTION

Figure 1:
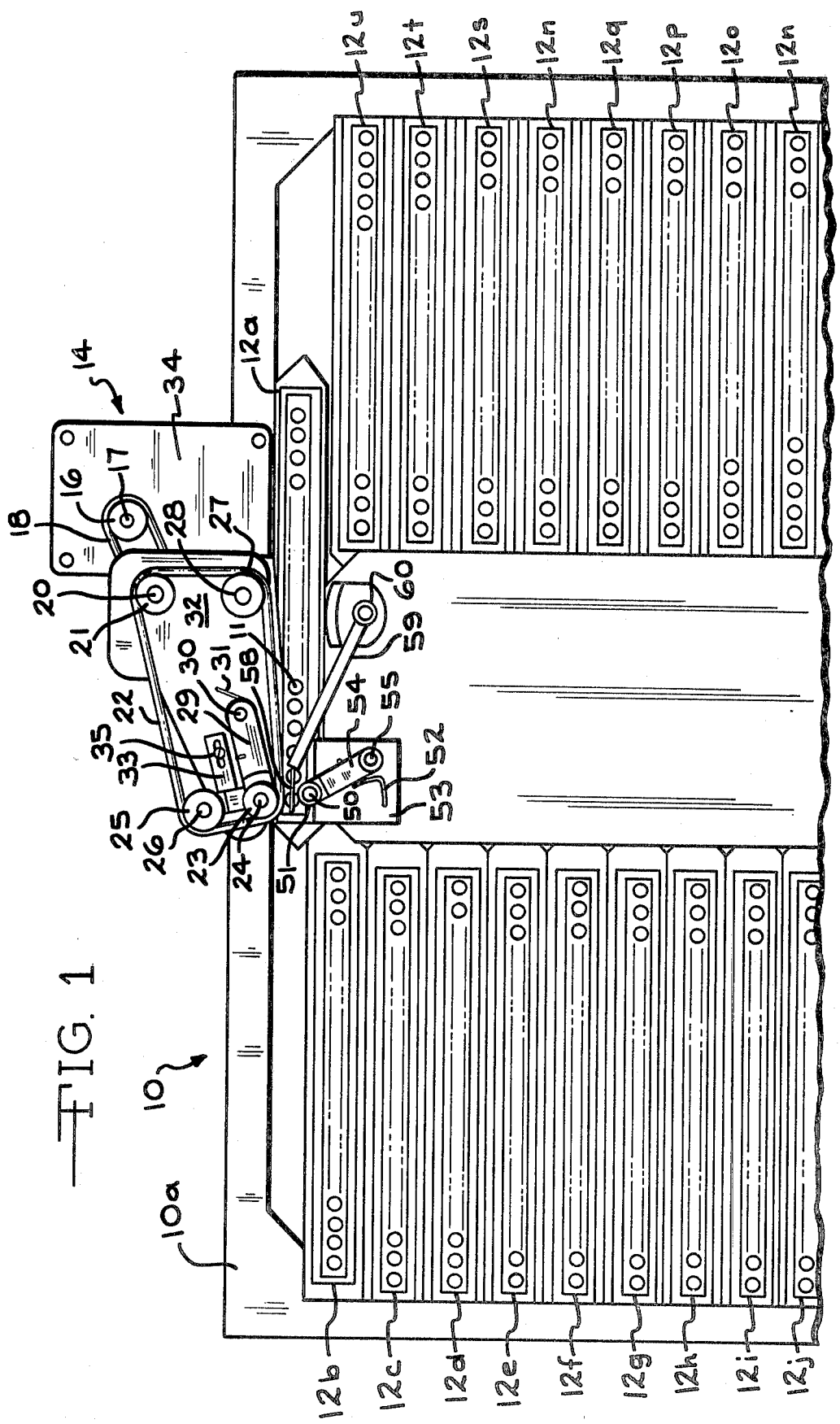
FIG. 1 is a plan view of the detection apparatus of the present invention particularly illustrating an indexing means and drive means for moving and for rotating tubes at a work station.

The present invention relates to an apparatus useful for determining the presence of a small object at a station which comprises:

indexing means for providing the object at the station, wherein the object is supported by a holder rotatable around an axis at the station and provided on a carrier for movement by the indexing means into and out of the station and wherein the indexing means stops the holder on the carrier at the station for a predetermined period of time;

drive means at the station to cause rotation of the holder around the axis while the carrier is stopped at the station;

photoelectric detection means including a coherent light beam emitter and a light beam detector responsive thereto such that when the holder is stopped at the station and rotated on the axis the light beam is interrupted by the object at the station; and electrical means responsive to the detector for determining the presence of the object at the station when the light beam is interrupted by the object as the holder is rotated.

The present invention also relates to an apparatus useful for determining and recording the presence of a filament at a station which comprises:

indexing means for providing the filament at the station, wherein the filament is provided in a light transparent container rotatable around a longitudinal axis at the station with the container provided on a carrier for movement by the indexing means into and out of the station and wherein the indexing means stops the container on the carrier at the station for a predetermined period of time;

drive means at the station to cause rotation of the container around the longitudinal axis while the container is stopped at the station;

photoelectric detection means including a coherent light beam emitter and a light beam detector responsive thereto such that when the container is stopped at the station and rotated on the axis the light beam is interrupted by the filament at the station; and counting means responsive to the detection means for determining and recording the presence of the filament at the station when the light beam is interrupted by the filament as the container is rotated.

The present invention also relates to a preferred apparatus wherein the filament is a root or shoot from a seed which is to be placed in a vertically oriented glass tube having an outside cylindrical surface as the container sealed at a lower end and open at the other end with a stopper at the open end so that at the station the seed in the container is below the light beam, wherein there are multiple tubes containing seeds which are indexable into the station on the carrier, wherein the shoots or roots from the seeds grow towards the stoppered ends of the tubes and produce an interruption of the light beam as each tube is rotated 360° by the drive means at the station, wherein the counting means detects and records the presence of the root or shoot as each tube is rotated and wherein the counting means records the number of seeds having roots or shoots in the multiple tubes as a function of time and treatment as each group of multiple tubes is indexed through the station.

The present invention also relates to the method for determining the presence of a filament at a station which comprises:

indexing the filament into the station with an indexing means, wherein the filament is supported by a holder rotatable around an axis by drive means at the station and wherein the indexing means stops the holder at the station for a predetermined period of time;

rotating the holder at the station around the axis with a drive means while the holder is stopped at the station;

photoelectrically detecting the presence of the filament at the station using a coherent light beam from a light beam emitter which is detected by a light beam detector responsive thereto, wherein the light beam is interrupted by the filament at the station as it rotates on the axis; and counting the presence of a filament at the station which interrupts the light beam with a counting means responsive to the detection means.

SPECIFIC DESCRIPTION

Figure 2:
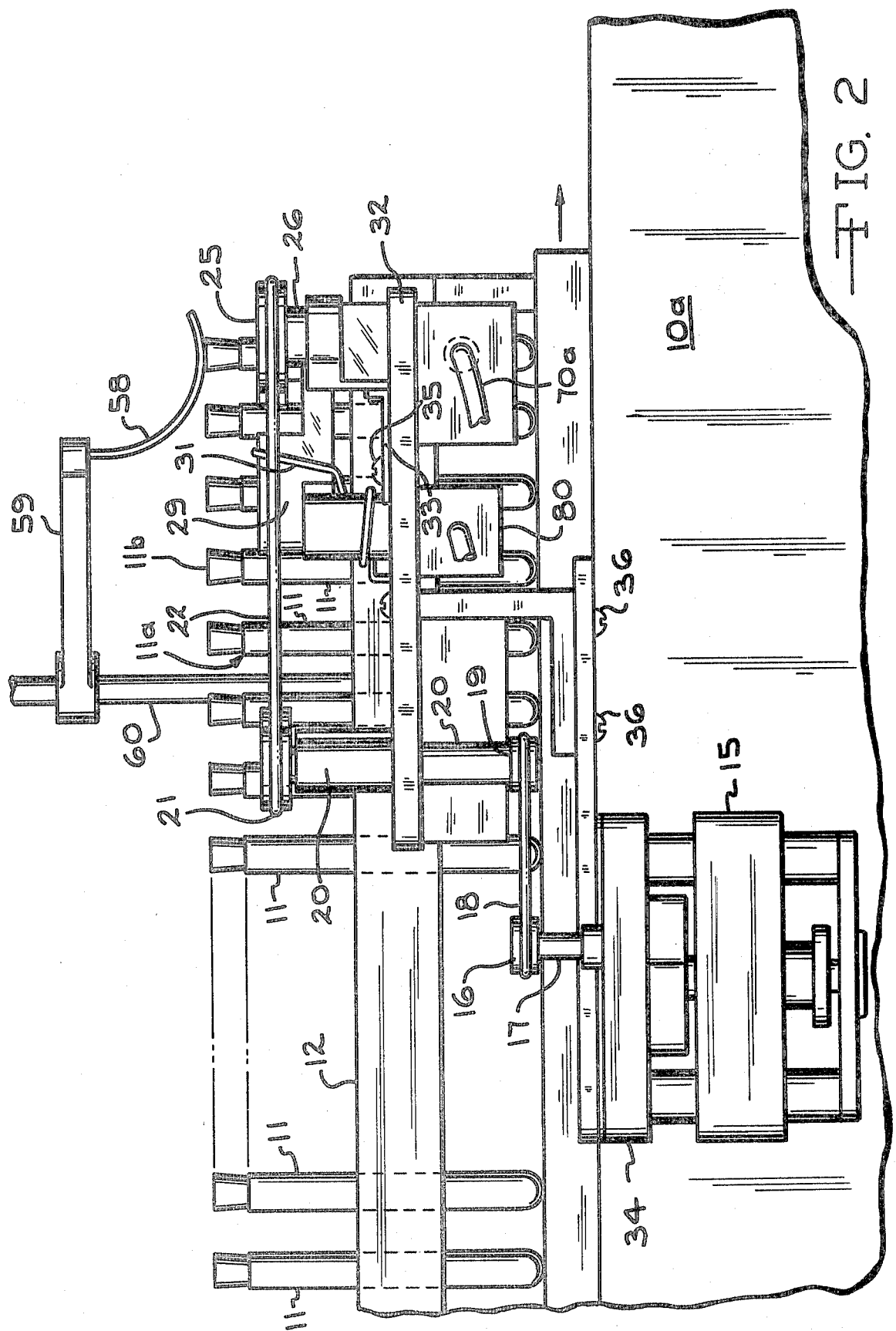
FIG. 2 is a front view of the detection apparatus of the present invention shown in FIG. 1 particularly illustrating the drive means.
Figure 3:
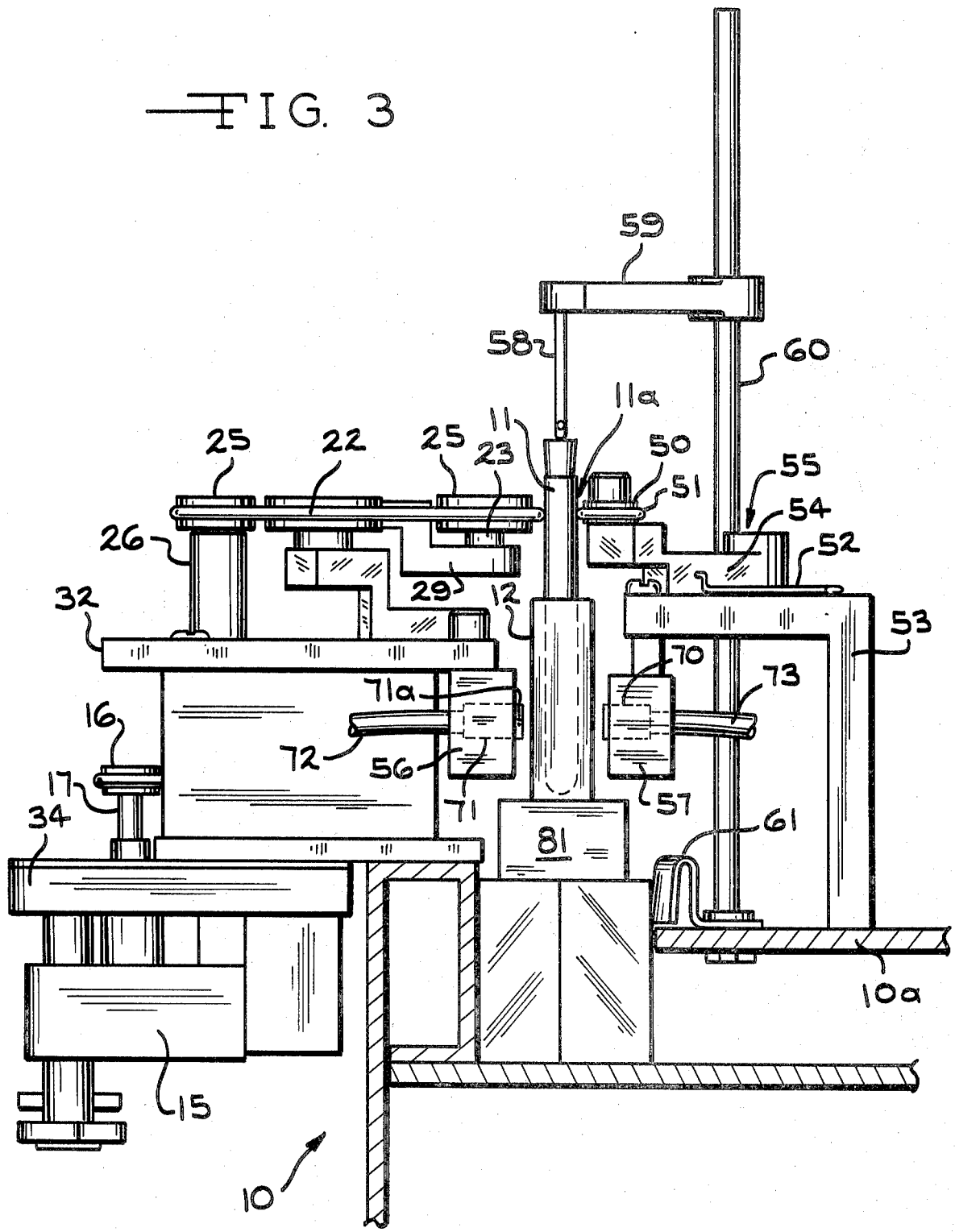
FIG. 3 is a side view of the detector apparatus drive means shown in FIG. 2 particularly illustrating the positioning of tubes in holders at the work station.

FIGS. 1 to 5 show the preferred apparatus of the present invention for the detection of seed germination wherein roots or shoots from a seed 200 provide a filament 201 which is detected. FIG. 1 shows a preferred indexing means 10 for providing tubes 11 having a cylindrical surface 11a on indexable trays 12 at a station 13. The tubes 11 with caps 11b are rotatably mounted in mating recesses in trays 12 as shown in FIG. 2. The indexing means 10 is commercially available from ISCO, P.O. Box 5347, 4700 Superior St., Lincoln, Ne. and is modified ISCO TM model 328 drop fraction collector wherein the drop head was removed and includes an internal drive means (not shown) and timer and control means 100 which operate together to move the trays 12 in frame 10a.

Adjacent to station 13, a drive means 14, including a motor 15 (FIG. 2) driving a first pulley 16 mounted on first shaft 17. Belt 18 mounted on pulley 16 is connected to a second pulley 19 mounted on a second shaft 20. A third pulley 21 is mounted on an opposite end of the shaft 20 from pulley 19 and supports a second drive belt 22 (preferably of rubber) connected to a fourth moveable pulley 23 mounted on a third shaft 24. Support pulley 25 (FIG. 1) on fourth shaft 26 and support pulley 27 on fifth shaft 28 are provided for a four (4) point tensioning of belt 22. The moveable pulley 23 is pivotably mounted on the arm 29 by pin 30. A spring 31 is provided with one end connected to a mounting plate 32 for shafts 20, 24, and 28 and the other end connected to the arm 29 so as to bias the arm 29 and pulley 23 towards the station 13 so that the belt 22 frictionally engages the cylindrical surface 11a of tube 11. Support pulley 25 is moveably mounted on an extension 33 held in place by screw 35 on plate 32 and positions the pulley 25 on shaft 26. The extension 33 provides a means for adequately tensioning belt 22 on pulleys 21, 23, 25 and 27. The drive means 14 is supported on the housing 10a of indexing means 10 by means of a bracket 34 attached to plate 32 by means of screws 36.

On the opposite side of the station 13 from the belt 22, a second pivotable pulley 50 is provided supporting a friction ring 51 (preferably of rubber) which engages the cylindrical surface 11a of tube 11 at a point about 180° from where the belt 22 engages the surface 11a. A second spring 52 with one end supported on an L-shaped support 53 mounted on the housing 10a and the other end on a second arm 54 is positioned such that the ring 51 positively engages the surface 11a of tube 11. Thus it can be seen that pulley 23 supporting belt 22 and a pulley 50 supporting ring 51 pinch the tube 11 sufficiently to provide positive rotation of the tube 11 by rotating belt 22. The arm 54 is mounted on pivot pin 55 supported by the L-shaped support 53. The support 53 and plate 32 mount guide bars 56 and 57 which position the trays 12 for linear movement through the station 13. The guide bars 56 and 57 are vertically adjustable for aligning LED 70 and detector 71. The tubes 11 are held in place for rotation by a resilient strip 58 supported by holder 59 mounted on a rod 60 extending from the housing 10a indexing means 10. This prevents vertical creeping of the tubes 11 in tray 12 as they are rotated 360° at station 13. A friction brake 61 holds trays 81 in position as the tubes 11 are rotated while permitting tray advance.

Figure 5:
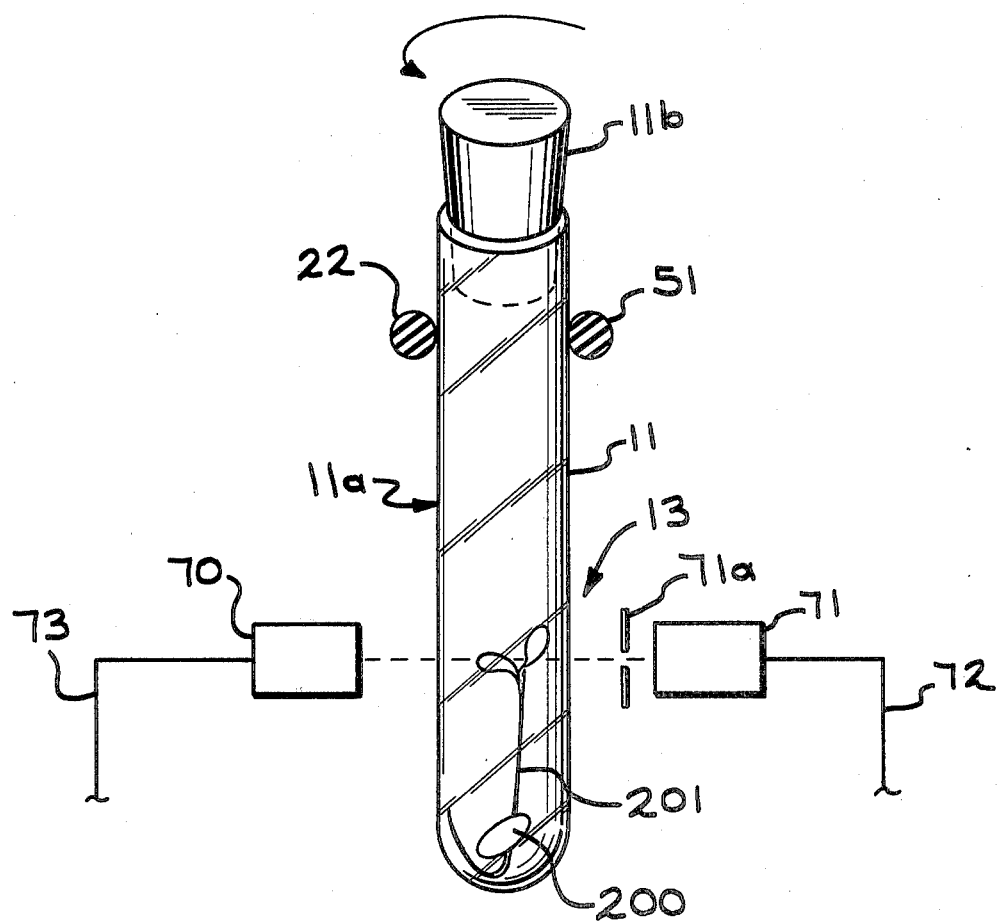
FIG. 5 is a schematic view of the rotation of a tube in the light beam at the work station and particularly illustrating a filament (root or shoot from a seed) which is eccentric to the longitudinal axis of the tube.

The tray 12 is open at the bottom. The tubes 11 are mounted in the tray 12 so that a coherent light beam can pass through them at the bottom. A coherent light beam is generated by an infrared light emitting diode (LED) 70 mounted through guide bar 56. A light detector 71 such as a phototransistor, responsive to the LED 70 is positioned on the guide bar 57. Thus the light from the LED can scan the rotating tube 11 for filaments. The output from the LED 70 and detector 71 act as a detection means which sends signals to a computer 102 and/or to a counter means 114 as discussed hereinafter (FIG. 5). A small aperture 71a having a diameter approximately equal to width of filaments to be detected covers light detector 71 to enhance signal to noise ratio.

Figure 4:
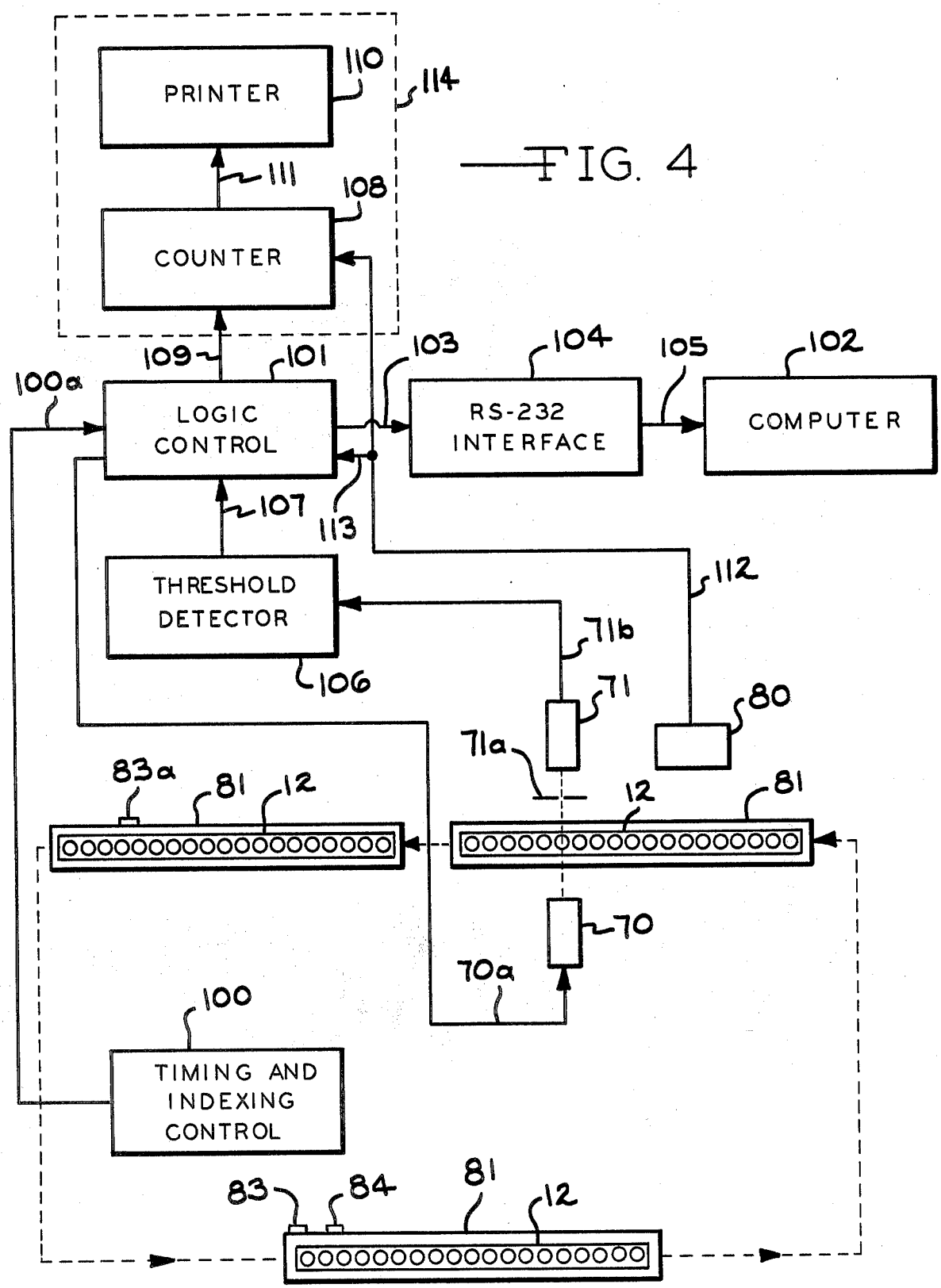
FIG. 4 is a schematic diagram of the electrical circuit for the detection apparatus.

As shown by FIG. 4, a metal detector 80 is provided adjacent each carrier 81 for tray 12 with an electrical line 112 connected to counter 108. A metal foil strip 83 is provided on each carrier 81 where appropriate such that the counter 108 detects and counts the passage of predetermined groups of glass tubes 11 and so that a complete revolution of all of the trays 12 to 12u is detected and counted by the counter 108 by means of metal strips 84. Thus metal strips 83 and 84 have twofold purpose. One purpose is detection of a complete revolution of all trays 12 around station 13. The second purpose is to define a group of tubes 11 as a treatment group such that all tubes 11 in this same treatment group will be treated as an entity. This "treatment group" is defined independently of tray number. Since a single tray has insufficient capacity to contain the minimum number of tubes 11 necessary to obtain a germination percentage, i.e., trays 12 on the preferred instrument hold 19 tubes 11, treatment groups comprise 30 tubes 11. Thus, strips 83 allows flexibility to modify treatment group number to suit an operator.

In the preferred apparatus a single metal strip 83 is positioned every thirtieth tube 11 to indicate the *end* of a treatment group. An extra metal strip 84 is placed adjacent to the strip for the last treatment group. This indicates that a cycle of 12 treatment groups has been completed. Actual location of strips on tube 11 trays 12 is offset (about 2½ tubes 11) from thirtieth tube positions because the treatment group detector 80 and germination detectors 70 and 71 are mounted in spaced apart physically separate locations. Thus, strips 83 and 84 for the end of last treatment group and grand totalizing are preferably located on the front side of tray 12a.

FIG. 5 shows the rotation of the tube 11 wherein the filament 201 from seed 200 is eccentric to the longitudinal axis of the tube 11 and detected when the light beam is interrupted by the filament during rotation of the tube 11.

In operation, the preferred apparatus of the present invention automatically measures and records cumulative seed germination. This measurement requires that a unique stage of morphological growth (arbitrarily defined as the germination point) be discriminated from other stages of earlier or later seed development. The principle of the apparatus is based on the knowledge that certain seeds 200 will grow rapidly and uniformly within small enclosed glass tubes 11 if supplied only with water. Furthermore, it was known that this growth would proceed up the inside of the tube 11 in proportion to particular stages of morphological development.

Plant scientists frequently but arbitrarily define seed germination in terms of attainment of a particular state of morphological growth. "Germination" can also be defined in terms of a specific expansion of growth of roots or shoots 201 up an enclosed tube 11. The apparatus, using the latter definition of germination, measures and records the time required for seeds to grow up individual glass tubes 11. By performing repeated evaluations at frequent intervals on a large number of seeds in tubes 11, cumulative germination data is easily collected by the counting means 102 and/or 114.

The operation of the apparatus is divided into four areas for the purpose of describing its operation.

1. Indexing mechanism 10 for moving seed tubes 11.
2. Seed germination detection means including LED 70 and detector 71.
3. Counter 108 and computer 102.
4. Control circuit 100 and 101 for interface 104 and computer 102 and for calculator means 114.

An available indexing means 10 to handle the movement of seed tubes 11 was used for ease of construction. The seed germination detector used an infrared emitting-diode 70. A 2 rpm gear motor 15 was used. The indexing means 10 included timing and control circuit 100 which moved carrier 81 containing the seed tubes 11 past the diode 70 and light detector 71. A signal is generated each time a carrier 81 is moved one position.

The trays 12 were designed to fit the standard ISCO carriers 81 such that the tube 11 capacity was 19 tubes per carrier 81. There are nineteen carriers 81. Thus the device has a total capacity of 361 tubes 11. Since a minimum of only 30 tubes are required to produce cumulative germination data, these 361 tubes are divided into 12 separate groups. This permits the simultaneous comparison of seed germination responses to a number of replicated, experimental treatment combinations (e.g. 4 treatments replicated 3 times). Each group is detected by the metal detector 80 which senses the presence of metal foil strips 83 attached to the carriers 81 at about every thirtieth tube 11 (not shown).

The LED 70 and detector 71 were mounted so that each glass tube 11 is passed between them and stopped for a predetermined amount of time selectable by the user by means of controls (not shown) on the commercial indexing means 10. As shown in FIG. 6, once the tube 11 is in position, it is rotated by means of belt 22. This is necessary to insure detection of any root or shoot 201 growth not in perfect alignment with the light beam from LED 70 initially.

A large number of seeds were to be examined. A commercial indexing system by ISCO was chosen because this unit provides:

1. An indexing system of trays which travel in a linear fashion past a detection area;
2. A timing system to control the duration between each advancement of the tray on position; and
3. A timer signal to indicate when the tray has advanced one position.

The intention of the electronic portion of seed germination detector is:

(1) To detect the moment in time a seed "germinates";
(2) To tabulate cumulative germination data with respect to treatment group and time; and
(3) To provide computer interface of events for expanded data analysis.

When the light beam from the LED 70 is interrupted, this registers a one-count for that position at a specific point in time. After a predetermined time has elapsed, which is controlled by the indexing means 10, the holder 81 is moved forward one position and the same step is repeated on the next tube 11. The counter 108 output can be selected by the user to record each tube 11 that contains a seed with enough growth to interrupt the light beam as a "1" using printer 110, or to provide totals of cumulative seed germination for each treatment group.

Logic control circuit 101 shown in FIG. 4 is external to the indexing means 10 and performs the following tasks. Each time a tube 11 on carrier 81 is moved into position at station 13, control circuit 101 sends a signal to the computer 102 which records the time of day and initially designates this tube 11 as one containing a nongerminated seed 200. If the seed in the tube 11 has in fact not germinated, the light beam is not interrupted and no further pulses are sent to the computer 102 prior to the movement of the next tube 11a into position. Thus, the tube 11 just examined would be designated by the computer 102 as containing a nongerminated seed. If however, the light beam is interrupted by a germinating seed 200, then a second pulse is immediately sent to the computer 102 instructing it to redesignate this tube 11 as one containing a germinated seed 200 with shoot 201. A pulse at this time is also sent to the counter 108 of calculator 114 for tabulation. The transmission of the second pulse to the computer 102 disables the detector circuit 71 so any future light beam interruptions due to the rotation of the seed root or shoot 201 does not result in additional pulses being sent to either the computer 102 or counter 108 prior to the next tube 11a. The logic control circuit 101 also detects pulses generated by the magnetic detector means 80 and routes these to the computer 102 and counter 108 and printer 110 for recording.

Referring to FIG. 4, timing and indexing control circuit 100, is contained inside the housing 10a. A signal from line 100a to logic control circuit 101 indicates when the carrier 81 is indexing to a new position. This signal from line 101 inhibits detection of a germinated seed until the tube 11 is properly positioned. This signal from line 100a is also sent to the computer 102 via line 103 to an interface 104 (RS-232) and line 105 to indicate to computer 102 to record that a new tube 11 is being examined.

A signal from the detector 71 is sent via line 71b to a threshold detector 10b which determines if the beam of light is just passing through the glass tube 11 or if a filament 201 has interrupted the beam. The signal is sent via line 107 to the logic control unit 101 which only allows this signal to be counted once, if the signal from line 100a is correct. This detected signal from line 100a is sent via line 103 to the interface 104 to the computer 102 via line 105. This signal represents the detection of a germinated seed. This signal also is sent to the counter 108 via line 109 to register an incremental count "1 plus" on printer 110, through line 111.

When the timing control circuit 100 times out for this tube 11, the indexing means 10 advances the tray 12 one position and the detection sequence repeats. If tray 12 has a metal strip 83, the counter 108 results are totaled via a signal from line 112 from metal detector 80 and the result for this treatment is printed via command signal from lines 111 and 112 to printer 110. This signal from line 113 is also sent to logic control circuit 101 and routed via line 103 to interface 104 and to computer 102 via line 105 to indicate a completed detection of a group. After the last selected treatment group has been examined, two strips of metal foil 84 via detector 80 and line 112 cause the counter 108 to grand total all treatments and print on printer 110 via a signal from line 111 the total germination for this complete pass of all samples. This signal via line 113 is also sent to logic control unit 101 and routed via line 103 to interface 104 and then to computer 102 via line 105 to indicate a complete pass of all treatments.

Power supply for elements 101, 104, 106, 70, 71, 80 are contained in logic control unit 101. 110 VAC is supplied to the unit 101. Power supply for elements 108 and 110 are contained inside a Texas Instruments TM 5015 calculator 114. 110 VAC is supplied to the calculator 114. Power supply for time and indexing is built into the indexing means 10. 110 VAC is supplied to the indexing means 10. Power supply for the computer 102 is 110 VAC. For simplicity, elements 101, 104, 106, 108, 110, 70, 71, 80 could all be supplied by single source 110 VAC.

Samples are loaded into tubes 11 within trays 12. The indexing means 10 is started, and timer 100 provides tube 11 advancement into work station after pre-determined time. Upon each advancement, a "detector inhibit" signal is provided to prevent false detection while samples move into station 13. When position is stable, tube 11 rotates and detection is enabled. If filament 201 is detected, it is counted, and detector 70 is disabled to prevent further counts. Timer 100, after pre-determined set time, advances to next sample in a tube 11. Detector 70 is enabled and sequence starts again.

The new apparatus offers several advantages over the more tedious and labor-intensive manual method of collecting cumulative seed germination data by counting growth on Petri dishes. First, the apparatus is fully automatic which permits its unattended operation for extended periods. Secondly, since the apparatus runs continuously, more information is collected at lower cost and with fewer errors than has been possible by manual methods. Third, a number of different seeds 200 or other objects are compatible with the apparatus, expanding its flexibility. Fourth, the apparatus is relatively small and easily fits within commercially available environmental chambers for temperature and light control.

We claim:

1. An apparatus useful for determining the presence of a small object at a station (13) which comprises:
   (a) indexing means (10) for providing the object at the station, wherein the object is supported by a holder (11) rotatable around an axis at the station and provided on a carrier (12, 81) for movement by the indexing means into and out of the station and wherein the indexing means stops the holder on the carrier at the station for a predetermined period of time;
   (b) drive means (14) at the station to cause rotation of the holder (11) around the axis while the carrier is stopped at the station;
   (c) photoelectric detection means including a coherent light beam emitter (70) and a light beam detector (71) responsive thereto such that when the holder is stopped at the station and rotated on the axis the light beam is interrupted by the object at the station; and
   (d) electrical means (102, 114) responsive to the detector determining the presence of the object at the station when the light beam is interrupted by the object as the holder is rotated.

2. An apparatus useful for determining and recording the presence of a filament at a station (13) which comprises:
   (a) indexing means (10) for providing the filament at the station, wherein the filament is provided in a light transparent container (11) rotatable around a longitudinal axis at the station with the container provided on a carrier (12, 81) for movement by the indexing means into and out of the station and wherein the indexing means stops the container on the carrier at the station for a predetermined period of time;
   (b) drive means (14) at the station to cause rotation of the container around the longitudinal axis while the container is stopped at the station; and
   (c) photoelectric detection means including a coherent light beam emitter (70) and a light beam detector (71) responsive thereto such that when the container is stopped at the station and rotated on the axis the light beam is interrupted by the filament at the station; and
   (d) counting means (102, 108, 110) responsive to the detection means for determining and recording the presence of the filament at the station when the light beam is interrupted by the filament as the container is rotated.

3. The apparatus of claim 2 wherein the filament is a root or shoot (201) from a seed (200) which is to be placed in a vertically oriented glass tube having an outside cylindrical surface (11a) as the container sealed at a lower end and open at the other end with a stopper (11b) at the open end so that at the station the seed in the container is below the light beam, wherein there are multiple tubes containing seeds which are indexable into the station on the carrier, wherein the shoots or roots from the seeds grow towards the stoppers (11b) on ends of the tubes and produce an interruption of the light beam as each tube is rotated 360° by the drive means at the station, wherein the counting means detects and records the presence of the root or shoot as each tube is rotated and wherein the counting means records the number of seeds having roots or shoots in the multiple tubes as a function of time as each group of multiple tubes is indexed through the station.

4. The apparatus of claim 3 wherein the counting means includes a computer 102 which analyzes data from the detection means which first detects the presence of a tube and then a filament at the station for recording by the counting means 100.

5. The apparatus of claim 3 wherein a resilient means (58) at the station engages the stopper on the tube to hold the tube in position in the carrier during rotation of the tube.

6. The apparatus of claim 2 wherein the container is a vertically oriented elongate glass tube with an outside cylindrical surface and wherein the drive means includes a belt (22) mounted on pulleys such that at the work station the belt frictionally engages the surface and rotates the tube around the longitudinal axis.

7. The apparatus of claim 2 wherein the carrier on the indexing means includes a linear tray (12) for parallel positioning of multiple tubes and wherein the tray linearly indexes each of the tubes through the station.

8. The apparatus of claim 7 wherein there are multiple linear trays which are each in turn sequenced through the work station, including a first tray and a last tray, and wherein detection means (80) is provided for detecting passage of the first tray and the last tray through the station by producing a signal which is recorded by the counting means.

9. The apparatus of claim 8 wherein the detection means is a metal detector for a first metal foil (84) mounted on the first tray (12a) for passage through the station prior to the indexing of a first tube in the first tray and a second metal foil 83 mounted on the last tray (12b) after indexing of a last tube in the last tray through the station and wherein the counting means records the signal from the metal detector.

10. The apparatus of claim 8 wherein each of the trays or sets of trays have a first tube and a last tube and wherein the detection means registers the presence of the first tube and last tubes in each tray or set of trays by means of which is recorded by the counting means.

11. The apparatus of claim 2 wherein the container is a vertically oriented tube with an outside cylindrical surface (11b) and wherein the drive means is a rotatable belt (22) positioned such that the tube is engaged on the outside cylindrical surface by the belt and wherein at one side of the station a first pivotable idler pulley (23) mounting the belt is urged towards the station by a first spring means (31) and on an opposite side of the station from the belt a second idler pulley (50) is urged towards the work station by a second spring means (52) such that the tube is firmly grasped between the first and second idler means for rotation by the belt.

12. The apparatus of claim 1 wherein the coherent light beam emitter is a light emitting diode.

13. The method for determining the presence of a filament at a station (13) which comprises:
  (a) indexing the filament into the station with an indexing means (10), wherein the filament is supported by a holder (11) rotatable around an axis by drive means (14) at the station and wherein the indexing means stops the holder at the station for a predetermined period of time;
  (b) rotating the holder at the station around the axis with a drive means (14) while the holder is stopped at the station;
  (c) photoelectrically detecting the presence of the filament at the station using a coherent light beam from a light beam emitter (70) which is detected by a light beam detector (71) responsive thereto, wherein the light beam is interrupted by the filament at the station as it rotates on the axis; and
  (d) counting the presence of a filament at the station which interrupts the light beam with a counting means (102, 108, 110) responsive to the detection means.

14. The method of claim 13 wherein the counting is of roots or shoots (201) as the filament growing from a seed (200) provided in a light transparent container (11) at the station such that the roots or shoots move into the path of the light beam and are counted by the counting means.

15. The method of claim 14 wherein there are multiple containers rotatably mounted on multiple trays (21) which are indexed into the station and wherein the counting means includes a computer (102) which sorts data from the multiple containers as to the presence of roots or shoots.

16. The method of claim 15 wherein a detection means (80) detects groups of trays and wherein the counting means counts the indexing of the groups of trays which move through the station.

17. The method of claim 13 wherein a detection means detects groups of trays as they move through the station which are counted by the counting means.

* * * * *